United States Patent
Gonsior

[11] Patent Number: 5,979,491
[45] Date of Patent: Nov. 9, 1999

[54] VALVE ARRANGEMENT ADAPTABLE TO MEET DIFFERENT LEAKAGE REQUIREMENTS

[75] Inventor: Wolfgang Gonsior, Bodolz, Germany

[73] Assignee: Xomox International GmbH & Co., Lindau, Germany

[21] Appl. No.: 08/859,248

[22] Filed: May 20, 1997

[30] Foreign Application Priority Data

May 22, 1996 [DE] Germany ............................ 196 20 694

[51] Int. Cl.⁶ ............................................... F16L 7/00
[52] U.S. Cl. ...................... 137/375; 251/214; 251/315.14
[58] Field of Search ............................ 137/375; 251/214, 251/315.14

[56] References Cited

U.S. PATENT DOCUMENTS

| | | | |
|---|---|---|---|
| 3,073,336 | 1/1963 | Johnson | 137/375 |
| 3,334,650 | 8/1967 | Lowrey et al. | 137/375 |
| 4,696,323 | 9/1987 | Iff | 137/375 |
| 4,886,241 | 12/1989 | Davis et al. | 251/214 |
| 4,930,748 | 6/1990 | Gonsior . | |
| 5,178,363 | 1/1993 | Icenhower et al. | 251/214 |
| 5,263,682 | 11/1993 | Covert et al. | 251/214 |
| 5,476,117 | 12/1995 | Pakula | 251/214 |
| 5,634,486 | 6/1997 | Hatting et al. | 251/214 |

FOREIGN PATENT DOCUMENTS

| | | |
|---|---|---|
| 0485743 | 5/1992 | European Pat. Off. . |
| 2315046 | 1/1977 | France . |
| 2412017 | 7/1979 | France . |
| 1288392 | 1/1969 | Germany . |
| 24 31 238 U | 4/1985 | Germany . |
| 89 10 895 U | 12/1989 | Germany . |
| 4016541 | 11/1991 | Germany . |
| 4331968 | 3/1995 | Germany . |
| 2074294 | 10/1981 | United Kingdom . |

Primary Examiner—A. Michael Chambers
Attorney, Agent, or Firm—Evenson, McKeown, Edwards & Lenahan, P.L.L.C.

[57] ABSTRACT

A valve arrangement including a housing (2) and a shut-off element (8) with which a shaft (10) is rotatably coupled, the passage of the shaft through the housing (2) being sealed by a sealing element (32). In addition to the first sealing element (32), which is disposed in an annular space between the shaft (10) and the housing (2), a second sealing element (42) may optionally be disposed at least partially within an annular body (3) connected to the housing (2). The valve arrangement is provided in the interior of the housing with a lining (20, 21). The lining (20) of the housing (2) extends at least to the first sealing element (32) with which it is in direct contact. The first sealing element (32), and the optional second element (42), if present, can be compressed by a bushing (48) which is movable axially along the shaft (10). The valve arrangement of the invention has the advantage that it can be upgraded at low manufacturing cost to minimize leakage rates and satisfy strict safety requirements.

21 Claims, 3 Drawing Sheets

VALVE ARRANGEMENT ADAPTABLE TO MEET DIFFERENT LEAKAGE REQUIREMENTS

BACKGROUND OF THE INVENTION

The invention relates to a valve arrangement comprising a housing, a shut-off element rotatably disposed in the housing, and a shaft which is coupled to the shut-off element for rotation therewith and which extends out of the housing and is sealed by means of a sealing element.

U.S. Pat. No. 4,930,748 discloses such a valve arrangement configured as a shut-off and control valve. A shut-off element, which is configured as a plug, is affixed to a shaft and disposed for rotation in a housing, two seals being provided to seal off the shaft at the top cap of the housing. The first seal is supported on an annular disk on the bottom of the cap, inside of the housing, while the second seal is associated with the exterior and if necessary it can be adjusted from the outside. Since the shut-off element is configured as a plug the axial position of the shaft can vary due to production tolerances, wear, external forces or the like. Since the inner, first seal is supported on the annular disk a securely operating seal is achieved independently of the axial position of the stem. The increased safety prescriptions and standards for environmental protection are satisfied, and the required limits of leakage rates are maintained for a long useful life. This valve arrangement is designed for special applications and uses and its production involves considerable manufacturing cost and complexity.

Pipe fittings lined or coated with plastic are used primarily in the chemical industry, especially fittings lined or coated with polytetrafluoroethylene (PTFE), fluoroethylene propylene (FEP) or perfluoroalkoxy (PFA). The manufacturing cost and expense, especially for the tools needed for producing plastic linings for valve housings and stems, are considerable. If the safety requirements imposed upon existing plants are increased, then the fittings must regularly be replaced with new fittings which satisfy the higher requirements. The costs of maintaining stocks of valve fittings in such cases are considerable for both manufacturers and dealers.

German Utility Model DE-U 89 10 895 discloses a valve arrangement which is configured as a ball valve in which the housing and also the ball are provided with a plastic coating. A shaft is formed integrally on the ball disposed for rotation in the housing, passes through the housing, and is surrounded by a special packing box. Disposed in the packing box is a sealing element against which a spring thrusts. This added-on packing box is arranged partially outside of the housing and another part extends into the interior of the housing as far as the ball. During manufacture, extra measures must be taken to assure dependable sealing of the packing box with respect to the valve housing. Also, the packing box is provided with a plastic coating which necessitates considerable manufacturing cost. Lastly, the packing box contains outwardly leading openings in the vicinity of the above-mentioned spring, and if the sealing element is damaged the medium flowing through the valve arrangement can escape through these openings.

German Utility Model DE-U 84 31 238 discloses a re-linable double packing box arrangement for a ball valve. An extension piece with a bottom plate, a comparatively long tube and a top plate are provided, and a spindle extension is disposed in the long tube. The tube and the two plates are joined together by weld seams. Furthermore, this arrangement has no coating or lining and is not readily suitable for use under high safety conditions.

German Patent No. DE 40 16 541 discloses a packing box packing which has active and passive sealing rings in a receiver. The passive packing box rings are designed for the transmission of axial forces and lie alternately with their radial inside surface upon the shaft or with their radial outside surface upon the wall of the packing box seal. A lining or coating is not provided.

SUMMARY OF THE INVENTION

Against this background, it is the object of the present invention to provide an improved valve arrangement of the above-mentioned kind which will minimize leakage rates and comply with stringent safety requirements, especially those of the technical regulations on air quality (TA-Luft).

Another object is to provide a valve arrangement which has a high reliability of operation and a long useful life.

A further object is to provide a valve arrangement in which the replacement or substitution of the elements is easy to perform.

An additional object is to provide a valve arrangement in which the medium-handling portions are lined internally, particularly with synthetic resin material (i.e., plastic), and which can be adapted as needed to meet different requirements with respect to leakage from the interior to the exterior.

These and other objects of the invention are achieved by providing a valve arrangement comprising a housing, a shut-off element rotatably disposed in the housing, a shaft which extends outwardly through an opening in the housing and is coupled to the shut-off element for rotation therewith, a first sealing element disposed in an annular space between the shaft and the housing for sealing the shaft, a bushing disposed around the shaft and movable axially therealong to compress the first sealing element against the shaft and housing, and a lining in the housing, the lining extending into contact with the first sealing element. In one configuration of the invention, the first sealing element is the sole shaft sealing element, and in an alternate configuration of the invention, the shaft is sealed by a double seal comprising the first sealing element and a second sealing element, whereby the same housing and valve shaft can be used for both configurations.

The valve arrangement of the invention is characterized by a simple and functional construction. To satisfy the requirements of a given installation, the valve arrangement may be equipped with a single or with a double shaft seal. The double shaft seal makes it possible to inspect for leakage or pressure superimposition to meet increased requirements for preventing leakage to the exterior and to the atmosphere. Adapted sealing systems of a uniform basic design are used for the different conditions of use or requirements regarding prevention of leakage to the atmosphere. It is especially advantageous that exact same housing and shaft can be used for both the single seal configuration and the double seal configuration. This eliminates the need to have two sets of very expensive tools to produce housing and shaft linings for both single seal and double seal valve arrangements. Furthermore, it is a special advantage that previously installed valve arrangements can be converted from a single seal configuration to a double seal configuration on the customer's premises. The configuration with the double sealing system is only slightly taller than the configuration with a single sealing system. The dimensions for installation and the like remain unchanged, so that identical parts, such as bridges and coupling and operating means such as levers and the like, are used for both configurations. Furthermore, the operation as well as adjustments or the like are identical for both configurations.

In one preferred embodiment, the shut-off element and the shaft each are configured as separate components which are fixedly joined together by couplers. The shut-off element is completely covered with a coating or lining, and likewise the shaft, the couplings desirably also being provided with a coating or lining.

In another preferred embodiment an extension body is associated with the shaft, such that a rotational force can be exerted by an operating means, for example a lever, through the extension body to turn the shaft and, ultimately, the shut-off element.

The sealing element or elements are disposed directly in the housing and in an optional abutting annular body, and their outer radial surfaces are directly in contact with the lining(s) of the housing and annular body. The inside diameter of the annular body lining is advantageously the same as the inside diameter of the lining of the bore in the housing provided for the sealing element.

The valve arrangement according to the invention will be described hereinafter with reference to a ball valve, but it should be understood that the invention is not restricted to ball valves. The valve arrangement according to the invention can be configured as a valve with a conical plug, as a turning cone valve or as a flap valve with a flap disk or the like. All embodiments of the valve arrangement have the decided advantage that a choice of sealing systems is available for different requirements, while the rest of the components, especially the plastic-lined housing and the plastic coated shaft, are identical.

Other embodiments and special configurations of the invention will be apparent from the following description.

BRIEF DESCRIPTION OF THE DRAWINGS

The invention will be described in further detail with reference to illustrative preferred embodiments shown in the accompanying drawings in which.

DETAILED DESCRIPTION OF PREFERRED EMBODIMENTS

Figure 1:
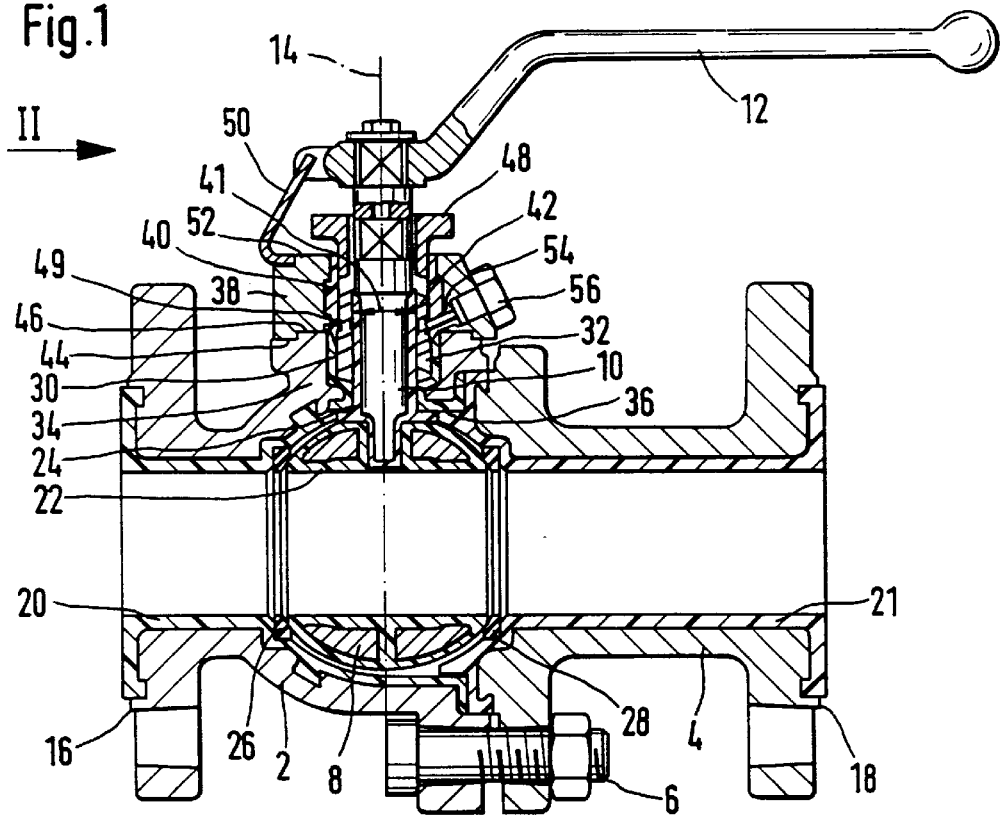
FIG. 1 is an axial section through a ball valve according to the invention configured with a double shaft seal.

The ball valve illustrated in FIG. 1 comprises a split housing with two housing parts 2 and 4 which are joined together by screws 6. A shaft 10 is rotationally fixed to a shut-off element 8, which in the drawing has an recess 9 at the top and is shown here as a ball. The shaft 10 has a projection 11 extending into the housing, which is shaped to correspond to the recess 9 in the shut-off element. The recess 9 and the projection 11 thus form coupling means for the transmission of torque. The recess 9 is preferably in the form of a slot in which the preferably flat projection 11 of the shaft is engaged. By means of a handle 12 rotationally fixed to the shaft 10, the shut-off element 8, which for the sake of simplicity will be referred to hereinafter as a ball, is moved to the desired rotational position with respect to the axis of rotation 14 of the shaft 10. Instead of the handle 12, it is within the scope of the invention to provide any other operating means, such as an electrical or pneumatic drive or a handwheel for manual operation, which are mentioned here only as examples.

The housing parts 2 and 4 each include a flange 16 and 18 for connection to a pipe (not shown). The insides of the medium-carrying areas of the housing parts 2 and 4, and also the flanges 16 and 18, are provided with linings 20 and 21 composed especially of synthetic resin material such as PTFE, FEP or PFA. The shut-off element 8 also is provided with a corresponding coating 22. Lastly, the shaft 10 has a coating 24 of this kind. The proposed valve arrangement is thus advantageously a lined or coated embodiment, and thus meets the safety requirements for corrosive and/or aggressive fluids at elevated temperatures and pressures. In order to form a seal between the shut-off element or ball 8 and the housing parts 2 and 4, sealing rings 26 and 28 are provided in a known manner.

The shaft 10 is inserted into a recess or bore 30 in the first housing part 2, and this bore 30 also is provided with the lining 20. In the recess or bore 30, a first sealing element 32 is provided, which is in sealing contact with the shaft 10 and its coating 24. With this first sealing element, a simple basic seal from the exterior is achieved where the shaft 10 passes through the housing. Preferably the first sealing element 32 is a normal packing, especially a PTFE packing. The first sealing element 32 is situated inside a neck 34 formed on the first housing part 2, inside an enlarged annular space which is present between the middle, cylindrical part of the shaft 10 and the neck 34. The sealing element 32 lies radially outward directly adjacent the lining 20 of the recess or bore 30 of the housing 2 and its neck 34. This annular space ends in the direction of the shut-off element 8 at a first step 36 on which the first sealing element 32 rests.

The axial end face of the neck 34 is adjoined by an annular body 38 whose inside surface is provided with a lining 40 like that of the neck 34. The lining 40 has an inside diameter 41 over its axial length and/or over the entire length of the annular body 38 which is preferably uniform. The inside diameter 41 is substantially the same size as the inside diameter of the lining 20 of the neck 34. A second sealing element 42 is arranged in an annular space inside the internal lining 40 on the inside surface of the annular body 38. In the radially outward direction this second sealing element 42 lies directly adjacent the inside surface of the inner lining 40 and in the radially inward direction, on the other hand, it lies adjacent the shaft 10, that is to say, adjacent the outer coating 24 of the shaft.

The end face of the neck 34 and the axially opposite bearing surface of the annular body 38 contain coaxial and mating steps or collars 44 and 46 such that the annular body 38 is disposed coaxially with the axis of rotation 14. By means of the second sealing element 42 disposed inside the annular body 38 in combination with the first sealing element 32, a sealing of the shaft 10 is achieved which corresponds to the improved and stricter safety requirements. By means of a sleeve or bushing 48 associated with the outer end of the second sealing element 42, it is possible to bias or compress the two tandem sealing elements 32 and 42, between which a ring 49 preferably is provided. To fix or limit the rotation of the handle 12 a stop or abutment 50 is provided, which is mounted on the annular body 38. The annular body 38 is formed with a step 52 for the abutment 50, which corresponds to the step 44 formed on neck 34.

The annular body 38, which axially adjoins and extends the neck 34, also contains a lateral bore 54 which can be closed tightly at its outside end by means of a screw 56. The inner end of the bore 54 opens in the area of the ring 49 between the two sealing elements 32, 42 and enables the effectiveness of the seal to be monitored or inspected. If an elevated pressure or any medium is found between the sealing elements, i.e., behind the first sealing element 32 (in the direction of its compression), a need to take remedial measures is indicated. The second sealing element 42 gives the assurance that, even in this case, any escape of the fluid medium to the exterior is prevented in order to satisfy strict safety requirements.

Figure 2:
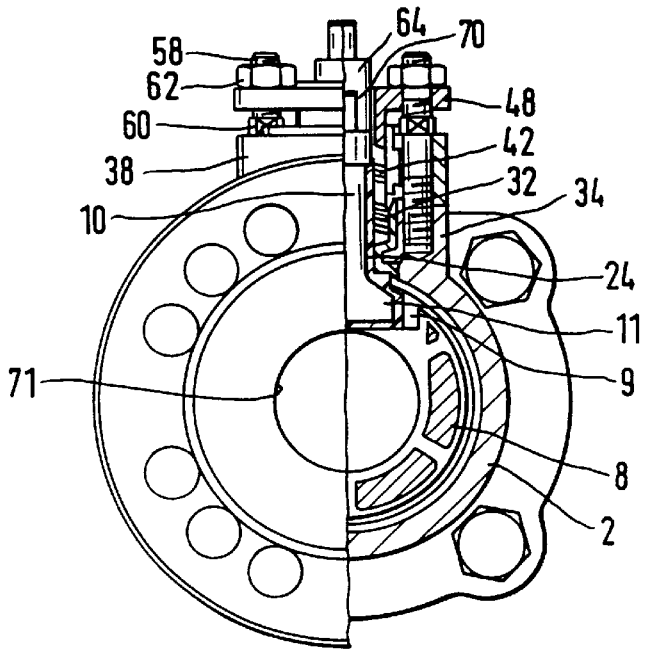
FIG. 2 is a partially cut-away axial view of the ball valve as viewed in the direction of arrow II in FIG. 1.

FIG. 2 shows, partially in an axial view and partially cut away, the ball valve with the annular body 38 and the sleeve or bushing 48 which is configured as an annular seat for producing the axial bias against the two sealing elements 32 and 42. The sleeve or bushing 48 is affixed to the neck 34 of the first housing part 2 by bolts 58. The bolts 58 each have an abutment 60, preferably in the form of a hexagon, which, on the one hand, permits the bolts 58 to be screwed into the neck and, on the other hand, assures that the annular body 38 is attached in a fixed position relative to the housing part 2. The upper ends of the bolts 58 pass through bores in the bushing 48 which is therefore adjustable by means of adjustable nuts 62 in the direction of the axis of rotation 14. The bushing 48 surrounds with a slight clearance an extension body 64 for the shaft 10. In this clearance or gap, an inner sleeve is preferably disposed, which will be described later. The extension body 64 comprises an additional key 66, which may in particular have a square configuration, and which projects upwardly out of the bushing 48 and is configured to mate with the above-mentioned handle or operating means so that they will rotate together. The extension key 66 has a configuration which corresponds to that of a shaft key 68, which preferably also has a square configuration, and which engages a mating recess 70 in the extension body 64. The extension body 64, therefore, transmits a rotary motion performed by the handle or other actuating means to the shaft 10 and thence to the shut-off element 8.

The recess 9 in the shut-off element 8 and the complementary extension 11 of shaft 10, which is engaged in the recess 9, are easily seen. The slot-like recess 9 extends transversely to the axis of the valve passageway 71. The axis of the valve passageway 71, which as shown in FIG. 2 is orthogonal to the plane of the drawing, is arranged perpendicular to the slot-like recess 9 and to the flat projection 11. The width of the plate or flat projection 11 and the width of the recess 9 are greater than the diameter of the shaft 10. It should be expressly noted that the shaft 10 with the projection 11 is provided with the coating 24. This coating 24 extends radially outward in a particularly advantageous manner at least so far that the second sealing element 42 also lies in contact with the coating 24. Thus on the one hand any damage to the outer surface of the shaft is reliably and lastingly prevented, and on the other hand wear on the second sealing element 42 is desirably minimized.

Instead of the two-part configuration of the shut-off element and shaft thus far explained, these parts can also be made in one piece. In the case of a one-piece design, the extension body 64 is of particular importance in order to be able to realize the configuration using only a single sealing element to be described hereinafter with reference to FIGS. 5 and 6. The shaft has the same length for both configurations. However, even in the two-part configuration of shut-off element and shaft described above, the uniform configuration and specified length of the shaft is of particular significance inasmuch as only a single tool is necessary for the production and application of the coating 24 on the shaft 10.

On the other hand, valve configurations with two shafts of different length also are within the scope of the invention. The longer shaft in such a case has the total length of shaft 10 plus the extension body 64 shown in FIG. 2. For the embodiment with only one sealing element, however, only the short shaft 10 shown in FIG. 2 is used.

Figure 3:
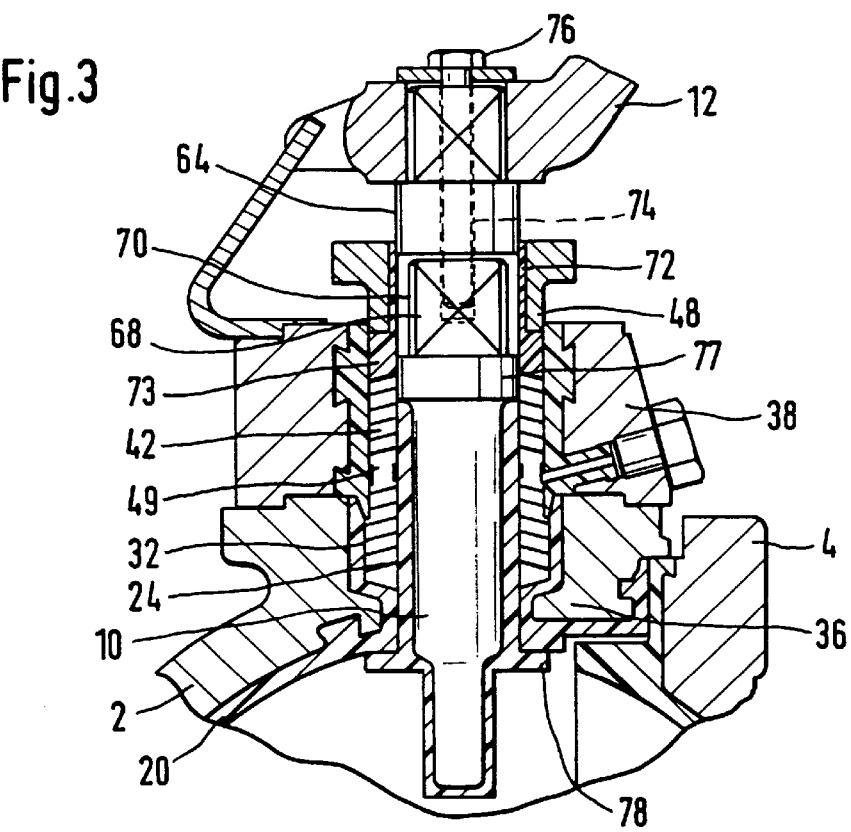
FIG. 3 is an enlarged view of the area of the shaft of the ball valve of FIG. 1.

FIG. 3 is an enlarged view of the upper part of the valve arrangement in the area of the shaft 10 with the extension body 64 and a portion of the handle 12. In an advantageous manner, the thickness of the plate or projection 11 is less than the diameter of the cylindrical stem 10. Also the corresponding recess in the shut-off element (shown in FIGS. 1 and 2), has a width smaller than the shaft diameter. In the above-mentioned annular clearance or gap between the extension body 64 and the bushing 48 there is an inner sleeve 72. This sleeve 72 advantageously serves as a radial guide for the extension body 64, so that unwanted forces on the shaft 10 and/or the shut-off element 8 are avoided. In accordance with the invention, inner sleeve 72 also serves as a lining for the bushing 48. Sleeve 72 furthermore contains a widened portion 73 which is in contact with the second sealing element 42. The axial adjustment and biasing forces are transferred by the widened portion 73 from the bushing 48 to the sealing elements 42, 32. It can be readily seen that the shaft coating 24 extends radially into the area of the second sealing element 42. The coating 24 ends at a flange or collar 77 of the shaft 10. The outside diameter of the collar 77 is preferably substantially equal to the outside diameter of the coating 24. As it can be seen, the second seal 42 lies partially on the coating 24 and partially also on the collar 77, the seal 42 having the same diameter throughout its length.

Lastly, the coating 24 has a radial flange 78 whose outside diameter is greater by a given amount than the outside diameter of the coating in the area of the seals 32 and 42 described above. The upper face of the flange 78 lies against the lining 20 of the housing 2 and its step 36. In this way an axial securing of the shaft 10 is assured an especially desirable manner. If desired, shaft 10 can also be formed with a flange inside of the coating flange 78. Since the flange 78 of the coating 24 and the lining 20 preferably are comprised of plastic, friction losses are reduced to a minimum.

The extension body 64 contains a central bore 74 through which a screw 76 is extended and is screwed at its lower end into an internal thread in the end of the shaft 10, i.e, in the shaft key 68. This screw 76 connects both the handle 12 and the extension body 64 to the shaft 10 in a rotationally fixed manner, i.e. so that they cannot rotate relative to each other. As already explained, the compression or bias of the two successive sealing elements 32 and 42 is established by the axial displacement of the bushing 48.

Figure 4:
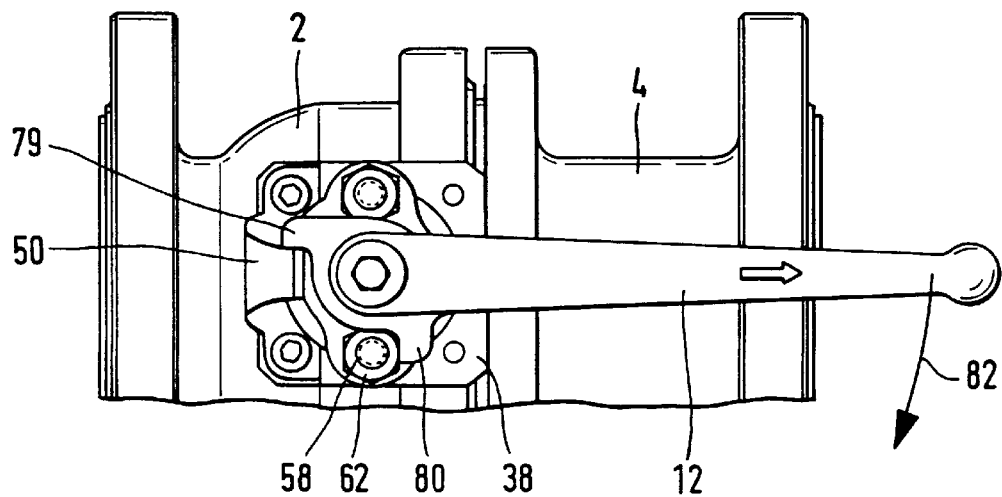
FIG. 4 is a top view of the ball valve of FIG. 1.

FIG. 4 shows a top view of the ball valve with the two housing parts 2 and 4 and the annular body 38 which is fastened by the two bolts 58 to the neck 34 of housing part 2. The bushing 48 is adjusted by means of the nuts 62 to establish the bias or compression of the sealing elements described above. The handle 12 has two projections 79 and 80 configured to engage the abutment 50 and can thus be turned in the direction of the arrow 82, whereupon the ball 8 is turned from the open position shown in FIG. 1 to the closed position.

Figure 5:
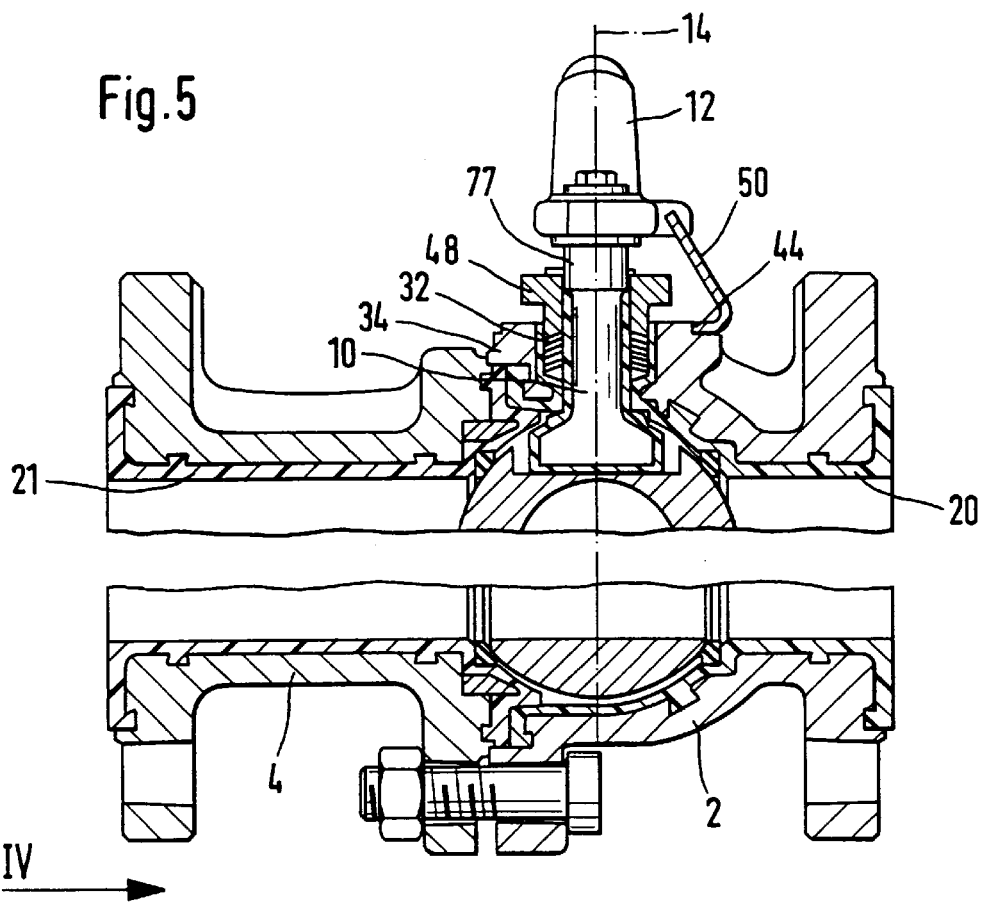
FIG. 5 is an alternate configuration of the ball valve of FIG. 1, with a single shaft seal.
Figure 6:
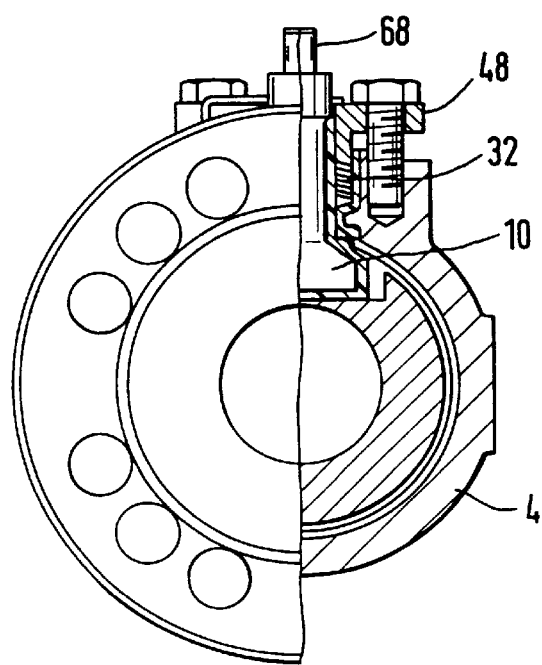
FIG. 6 is a partially cut-away view and partially axial view of the ball valve of FIG. 5, viewed in the direction of arrow VI.

FIGS. 5 and 6 show an alternate configuration of the ball valve corresponding to the ball valve of FIGS. 1 and 2. The housing parts 2 and 4 and also the shaft 10 have shapes identical to the configuration explained above, and likewise the first sealing element 32 in the neck 34 of housing part 2. It is to be noted that, in contrast to FIG. 1, in FIG. 5 the two housing parts 2 and 4 are depicted in a position turned 180° about the axis 14. The handle 12 in this configuration is attached directly to the shaft 10, in which case the extension body 64, the annular body 38 and the second sealing element 42 are omitted. The packing box bushing 48 is again the same as in the first configuration, but in this case is attached directly to the housing 2. The collar 77 in this configuration extends partially inside the bushing 48. On the other hand, the coating 24 likewise extends from the inside partially into the bushing 48. A reliably operating radial guide for the shaft 10 is thus assured.

The linings 20 and 21 of the two housing parts also were produced with the same tools as in the case of the two housing parts of the first configuration. The abutment 50 is secured in its rotational position on the step 44 of the neck 34, the step 44 being configured and positioned the same as the step 52 described for the annular body 38 used in the configuration of FIG. 1. The configuration explained in connection with FIGS. 5 and 6 has a simple shaft seal in the form of the first sealing element 32, but the essential components, such as especially the housing parts 2 and 4, the shaft 10, also the first sealing element 32, the bushing 48, the abutment 50 and the handle 12 are constructed identically to the first configuration.

The foregoing description and, examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve arrangement adaptable to meet different requirements with respect to leakage comprising:
   a housing including a part on which a neck is formed,
   a shut-off element rotatably disposed in the housing,
   a shaft which extends outwardly through an opening in the housing and is coupled to the shut-off element for rotation therewith, the shaft having a coating which extends beyond an axial end face of the neck,
   a first sealing element disposed in a first annular space between the shaft and the neck for sealing the shaft,
   a bushing disposed around the shaft and movable axially therealong to compress said first sealing element against the shaft and the neck,
   a lining in said housing, said lining extending into said neck and into contact with said first sealing element, and
   a one-piece annular body optionally disposed on the axial end face of the neck, with a second annular space being provided between a lining on an inside surface of the annular body and the shaft over a total height of the annular body and a second sealing element disposed in said second annular space such that the bushing can also compress said second sealing element,
   the second annular space having a radial width which is substantially the same size as the first annular space, the annular spaces directly adjoining one another,
   the annular body lining directly adjoining the housing lining,
   the bushing being joined by bolts passing through bores to the neck,
   the neck being circumferentially continuous, being provided internally with the housing lining over its entire height, and having a step located between the first sealing element and the rotatable shut-off element.

2. A valve arrangement according to claim 1, wherein said second sealing element is disposed around said shaft and extends at least partially within said annular body.

3. A valve arrangement according to claim 1, wherein said housing comprises two housing parts joined to each other.

4. A valve arrangement according to claim 1, wherein the housing lining is formed of synthetic resin material.

5. A valve arrangement according to claim 1, wherein the annular body lining is formed of synthetic resin material.

6. A valve arrangement according to claim 1, further comprising a shaft extension connected to the shaft for rotation therewith such that the shaft and the shut-off element can be rotated by turning the shaft extension.

7. A valve arrangement according to claim 6, wherein the shaft extension has a recess at one end for matingly receiving a shaft key formed on the outer end of the shaft, and the other end of the shaft extension is formed with an extension key having the same configuration as the shaft key.

8. A valve arrangement according to claim 7, further comprising a handle keyed to the extension key for rotating the shaft extension, the shaft and the shut-off element.

9. A valve arrangement according to claim 1, wherein the shaft has a shaft coating which extends continuously axially therealong from the housing interior to the second sealing element.

10. A valve arrangement according to claim 9, wherein the shaft coating is formed of synthetic resin material.

11. A valve arrangement according to claim 1, wherein the annular body lining axially abuts the housing lining.

12. A valve arrangement according to claim 1, wherein the annular body has a bore which extends radially therethrough, and which can be closed sealingly.

13. A valve arrangement according to claim 12, wherein said bore is closed by a sealing screw.

14. A valve arrangement according to claim 12, wherein the bore has a radially inner end which opens between the first and second sealing elements.

15. A valve arrangement according to claim 1, wherein the annular body lining has a substantially constant inside diameter over its entire length.

16. A valve arrangement according to claim 1, wherein said first and second sealing elements have the same configuration.

17. A valve arrangement according to claim 1, wherein said first and second sealing elements are configured as packings.

18. A valve arrangement according to claim 17, wherein the packings are formed of polytetrafluoroethylene.

19. A valve arrangement according to claim 1, wherein the one-piece annular body is not provided on the axial end face of the neck and said first sealing element is the sole shaft sealing element.

20. A valve arrangement according to claim 1, wherein said shaft is sealed by a double seal comprising said first sealing element and said second sealing element.

21. A valve arrangement according to claim 1, further comprising a ring member disposed between the first sealing element and the second sealing element.

* * * * *